United States Patent
Wyle et al.

(10) Patent No.: US 7,454,371 B2
(45) Date of Patent: Nov. 18, 2008

(54) SYSTEM AND METHOD FOR MANAGING LOGIN RESOURCES FOR THE SUBMISSION AND PERFORMANCE OF ENGAGEMENTS

(75) Inventors: David A. Wyle, Newport Coast, CA (US); Makarand Karkare, Deonar (IN)

(73) Assignee: SurePrep, LLC, Newport Beach, CA (US)

(*) Notice: Subject to any disclaimer, the term of this patent is extended or adjusted under 35 U.S.C. 154(b) by 1288 days.

(21) Appl. No.: 10/448,483

(22) Filed: May 30, 2003

(65) Prior Publication Data

US 2004/0243626 A1 Dec. 2, 2004

(51) Int. Cl.
- G06F 17/22 (2006.01)
- G07F 19/00 (2006.01)
- G06Q 20/00 (2006.01)

(52) U.S. Cl. .............................. 705/31; 705/19; 705/18
(58) Field of Classification Search .................... 705/31
See application file for complete search history.

(56) References Cited

U.S. PATENT DOCUMENTS

| | | | |
|---|---|---|---|
| 4,754,326 A | 6/1988 | Kram et al. |
| 5,144,115 A | 9/1992 | Yoshida |
| 5,404,294 A | 4/1995 | Karnik |
| 5,737,599 A | 4/1998 | Rowe et al. |
| 5,787,295 A | 7/1998 | Nakao |
| 5,878,215 A | 3/1999 | Kling et al. |
| 5,940,811 A | 8/1999 | Norris |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,173,285 B1 | 1/2001 | Nishita et al. |
| 6,202,052 B1 | 3/2001 | Miller |
| 6,209,095 B1 | 3/2001 | Anderson et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |

(Continued)

OTHER PUBLICATIONS

Harvey, Greg. Adobe Acrobat 5 PDF For Dummies, 2002, Wiley Publishing, Inc., pp. 13-34.

*Primary Examiner*—F. Zeender
*Assistant Examiner*—Fahd A Obeid
(74) *Attorney, Agent, or Firm*—Snell & Wilmer L.L.P.

(57) ABSTRACT

A method for managing the submission of a plurality of engagements using a plurality of logins is disclosed. The method might include the steps of providing a plurality of logins corresponding to a single entity, wherein each of the plurality of logins includes a user name, a password and a location code, providing information relating to the plurality of engagements, receiving an identification code and a location code corresponding to the single entity and an engagement code corresponding to one of the plurality of engagements, and searching the plurality of logins for an available login. If an available login does not exist, then create an available login or return to the searching step. If an available login exists, then assign the available login to one of the plurality of engagements, and make the available login, unavailable.

16 Claims, 6 Drawing Sheets

U.S. PATENT DOCUMENTS

| | | |
|---|---|---|
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,567,628 B1 | 5/2003 | Guillemin et al. |
| 6,572,661 B1 | 6/2003 | Stern |
| 6,658,464 B2 | 12/2003 | Reisman |
| 6,721,783 B1 | 4/2004 | Blossman et al. |
| 6,957,384 B2 | 10/2005 | Jeffery et al. |
| 7,171,615 B2 | 1/2007 | Jensen et al. |
| 7,234,103 B1 * | 6/2007 | Regan ........................ 715/234 |
| 2001/0037268 A1 | 11/2001 | Miller |
| 2001/0044762 A1 | 11/2001 | Nault |
| 2002/0161698 A1 * | 10/2002 | Wical ........................ 705/38 |
| 2002/0161796 A1 | 10/2002 | Sylthe |
| 2003/0036912 A1 | 2/2003 | Sobotta et al. |
| 2003/0061131 A1 | 3/2003 | Parkan, Jr. |
| 2003/0163547 A1 * | 8/2003 | Beisty et al. ................ 709/217 |
| 2003/0233296 A1 | 12/2003 | Wagner |
| 2004/0024665 A1 | 2/2004 | Foster |
| 2004/0088233 A1 | 5/2004 | Brady et al. |
| 2004/0150854 A1 | 8/2004 | Sprague et al. |
| 2004/0216057 A1 | 10/2004 | Wyle et al. |
| 2004/0225581 A1 | 11/2004 | Wyle et al. |
| 2005/0038722 A1 | 2/2005 | Throndson et al. |
| 2006/0026083 A1 | 2/2006 | Wyle |
| 2006/0155618 A1 | 7/2006 | Wyle |

* cited by examiner

SYSTEM AND METHOD FOR MANAGING LOGIN RESOURCES FOR THE SUBMISSION AND PERFORMANCE OF ENGAGEMENTS

BACKGROUND OF THE INVENTION

1. Field of the Invention

The present invention relates generally to managing login resources, and more particularly to a system and method for managing login resources for the submission and performance of engagements.

2. Description of the Related Art

The Internet allows users from various locations the ability to access information or use a software application from a particular website by inputting its web site address into a web browser. Some websites require the user to register with the website before being able to access the information or use the software application. During the registration process, the user may be requested to input a login, such as a user name and a password, to access the website. In addition, the user may be required to pay a fee for accessing the information or using the software application.

Other websites allow companies the ability to provide information, via the web browser, to perform and complete a requested engagement or task, such as the preparation of an income tax return. For example, GoSystem Tax Remote Server from Research Institute of America of New York, N.Y., is a web-based tax return preparation and management software application where companies can pay a fee, login and prepare income tax returns online. Alternatively, the company can pay the fee and then provide the information and the login to a third party, who can access the website (using the login) to prepare and complete the requested engagement. For example, to access the GoSystem Tax Remote Server, the company or third party is required to have a login and a unique tax locator. Using the login, the company can access the GoSystem Tax Remote Server and can prepare the income tax return corresponding to the unique tax locator. However, once logged in, a user can only prepare one income tax return at a time. In addition, each login can only be used by one user at a time. Therefore, the number of logins that need to be purchased must be equal to the number of users preparing tax returns concurrently.

One drawback of conventional Web-based systems is that the number of logins that are required at a given time constantly changes. Therefore, managing the number of logins to ensure that the engagements are performed in a timely manner is difficult, costly and cumbersome. For example, the preparation of each income tax return may require a login, which is difficult to manage if multiple income tax returns are to be prepared. Another drawback of conventional Web-based systems is the difficulty in assigning a login for every concurrently performed engagement. Even though the same login may be used a number of times, only one login can be supplied at a time. That is, once a login is submitted for a particular engagement, the same login cannot be used until the particular engagement is complete. Hence, problems may exist when a large number of engagements need to be concurrently prepared but only a limited number of logins are available.

SUMMARY OF THE INVENTION

One embodiment of the present invention is a computer-implemented method for managing the submission of information. The method might include the steps of providing a plurality of logins at a first device, wherein each of the plurality of logins has a status of available or unavailable, searching the plurality of logins for at least one login that has a status of available, providing an image file at the first device and the at least one login that has the status of available, and changing the status of the login from available to unavailable. The method might also include the steps of transmitting the image file and the login to a second device, receiving a tax file from the second device, and changing the status of the login from unavailable to available.

Another embodiment of the present invention is a computer-implemented method for managing the submission of a plurality of engagements using a plurality of logins. The method might include the steps of providing a plurality of logins corresponding to a single entity, wherein each of the plurality of logins includes a user name, a password and a location code, providing information relating to the plurality of engagements, receiving an identification code corresponding to the single entity and an engagement code corresponding to one of the plurality of engagements, and searching the plurality of logins for an available login. If an available login does not exist, then create an available login or return to the searching step. If an available login is not created, then the engagement to be submitted is added to a queue where it waits for an available login. If an available login exists, then assign the available login to the one of the plurality of engagements, and make the available login, unavailable.

Another embodiment of the present invention is a method for managing the submission of a plurality of engagements using a plurality of logins. The method might include instructions operable to cause a computer to store a plurality of logins corresponding to a single entity, wherein each of the plurality of logins includes a user name, a password and a location code, receive an identification code corresponding to the single entity and an engagement code corresponding to an engagement, search the plurality of logins for an available login, assign the available login to the engagement code, and make the available login, unavailable.

Advantages of the present invention include submitting an engagement to a service provider when a login is available and providing a system where the service level (e.g., turnaround time) accounting begins when the engagement has been assigned a login. The user requesting performance of the engagement can optimize the number of logins it has to purchase. The system automatically monitors and tracks the status of multiple logins and assigns the available logins to the engagements. The user is immediately notified if not enough logins exist to simultaneously perform multiple engagements and is given the opportunity to correct the situation by adding logins. This advantageously provides the company with a way of tracking whether an adequate number of logins have been supplied to ensure that the service level is not negatively impacted. Also, the company is immediately notified if the engagement has been submitted.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
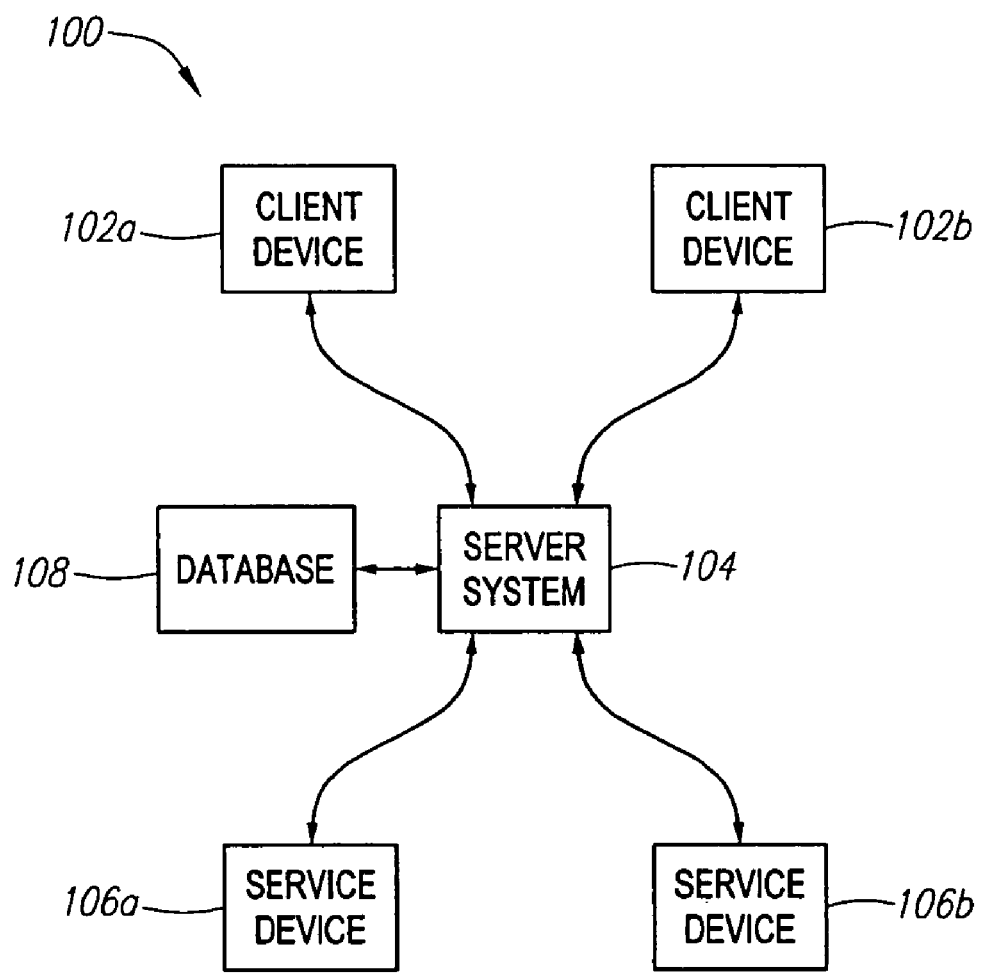
FIG. 1 is a simplified block diagram illustrating a system used to implement the method in accordance with an embodiment of the present invention.

FIG. 1 is a simplified block diagram illustrating a system 100 having a number of client devices 102, a number of server systems 104, and a number of service devices 106, all of which can communicate with one another via a network (not shown), for example the Internet. For illustrative purposes, the system 100 can include two client devices 102a, 102b, one server system 104, and two service devices 106a, 106b, all of which can be connected to one another via the network. The client devices 102 and the service devices 106 are typically desktop computers. Alternatively, the client devices 102 and the service devices 106 can be laptop computers, palmtop computers, handheld devices, servers or any other device(s) capable of communicating with the server system 104. The client devices 102 and the service devices 106 can be used to receive, access, view, edit and transmit information embodied in the form of, for example, documents, files, pages, pictures and windows. Each client device 102 and each service device 106 can be located in a different location.

The server system 104 is a server, such as a ProLiant Server from Hewlett-Packard Company of Palo Alto, Calif., for accessing, viewing, routing, verifying and processing the information and requests received from the client devices 102 and the service devices 106. In one embodiment, the server system 104 includes an automated application or system for communicating with the service devices 106 such that user interaction can be minimized. Also, the server system 104 can be used to create, edit and delete a number of logins. The server system 104 can include a database 108 for storing information such as the login, the documents and the files. In addition, the server system 104 can copy and transfer the information to the service devices 106 and delete the information from the service devices 106.

Figure 2A:
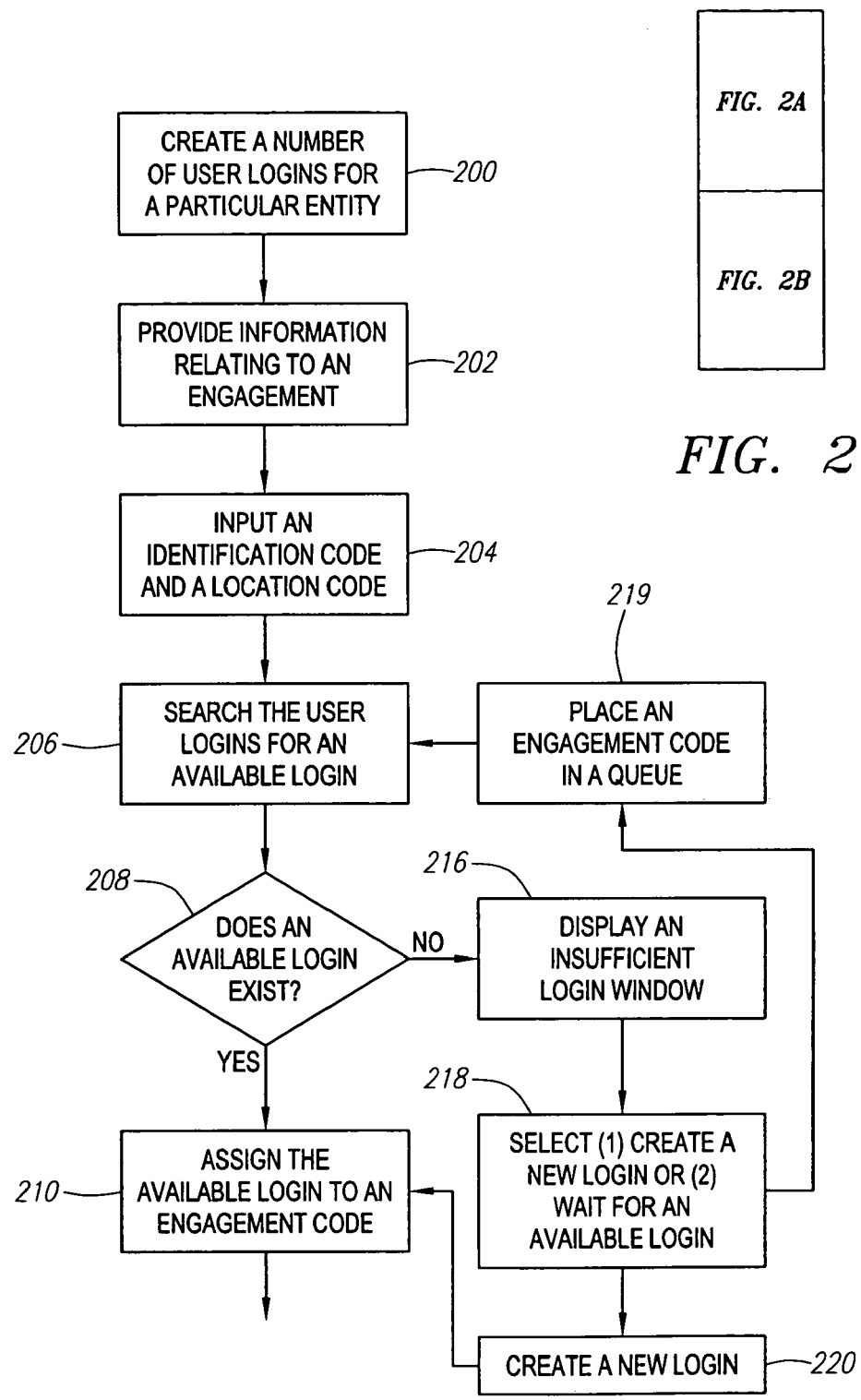
FIG. 2 is a flowchart illustrating a method for managing the submission of information in accordance with an embodiment of the present invention.
Figure 2B:
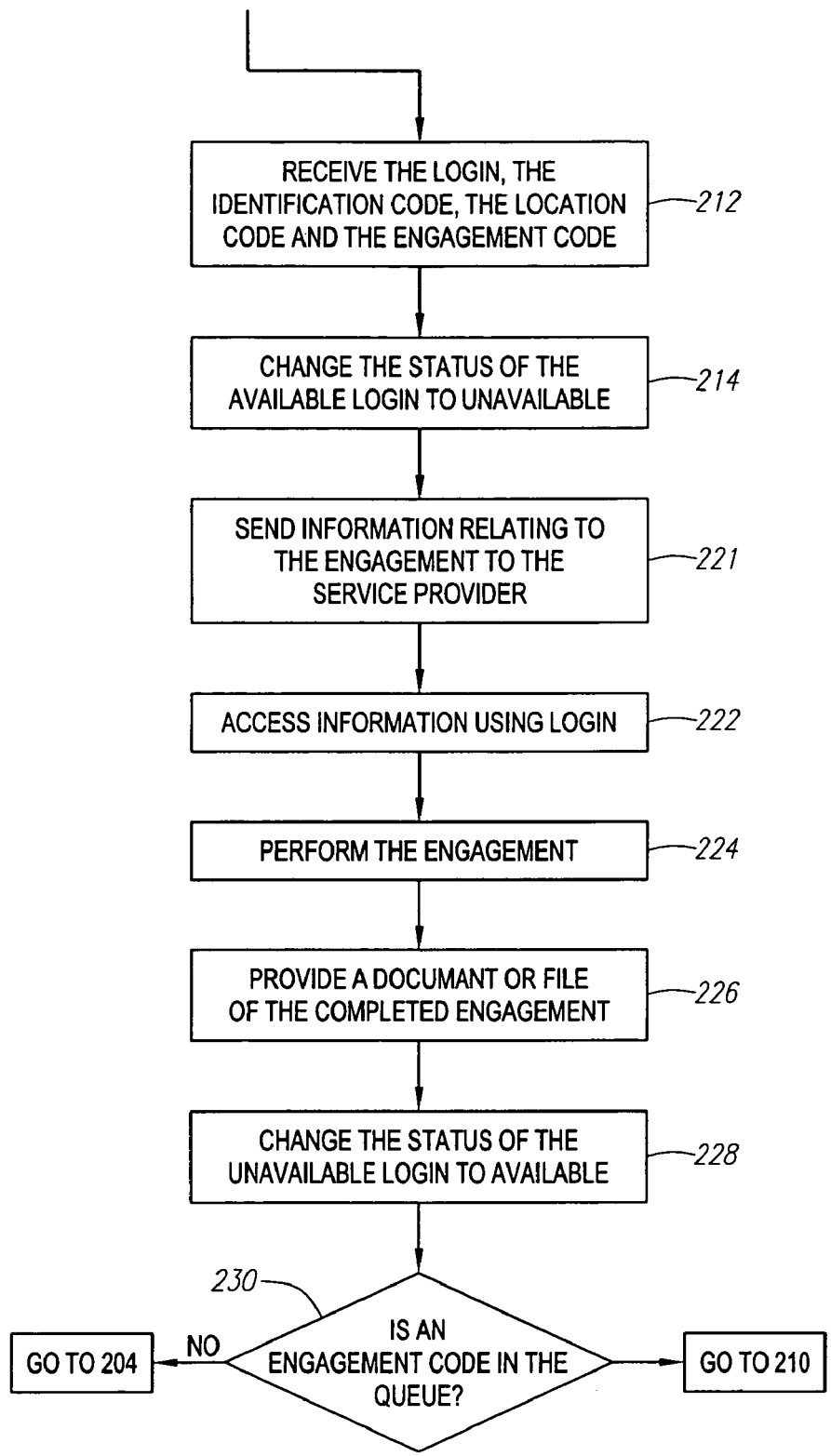
Figure 3:
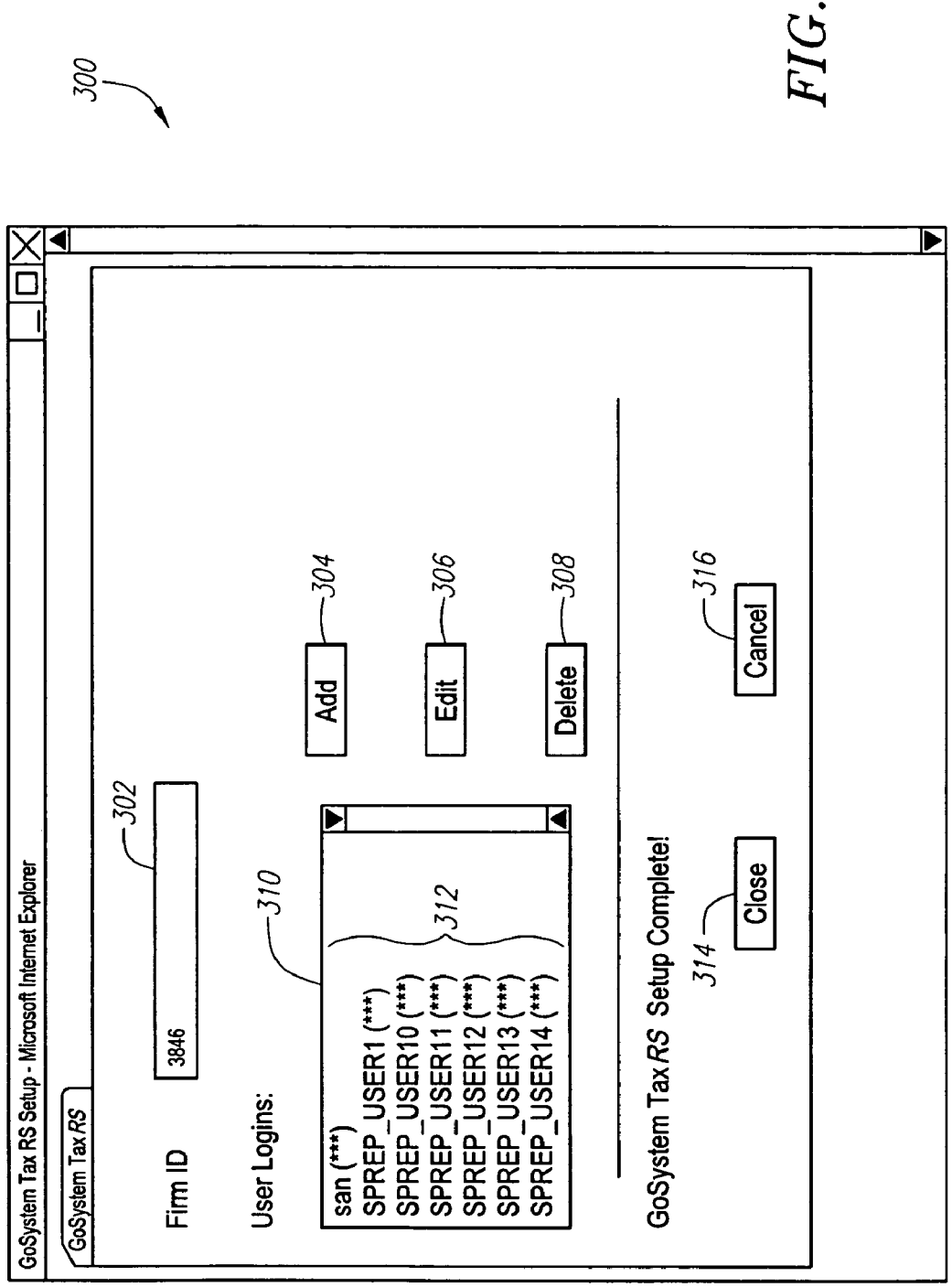
FIG. 3 is a view of a setup screen generated by the server system in order to allow a user the ability to add, edit and delete a login in accordance with an embodiment of the present invention.

FIG. 2 is a flowchart illustrating a method for managing the submission of information relating to an engagement from, for example, the client device 102a to the service device 106b. FIG. 2 is comprised of FIG. 2A and FIG. 2B. Initially, a system administrator logs on to the server system 104 and creates a number of logins for a particular entity (e.g., a company), which can be an accounting firm that desires to outsource engagements, for example, the preparation of income tax returns (step 200 in FIG. 2A). The term "engagement" may be defined as a job, project or task such as the preparation of income tax returns, financial statements, financial records, loan applications or any other defined task having a set of input and a desired output. Typically, the entity chooses the number of logins desired and pays a fee for each login, which can be used to perform an engagement. In one embodiment, the system administrator can add, edit and delete a login using a setup screen 300, as shown in FIG. 3. For example, the system administrator can input an identification code 302 for the desired entity and select (or click on) an add button 304 to add, an edit button 306 to edit, and a delete button 308 to delete a login for that particular entity (FIG. 3).

Figure 4:
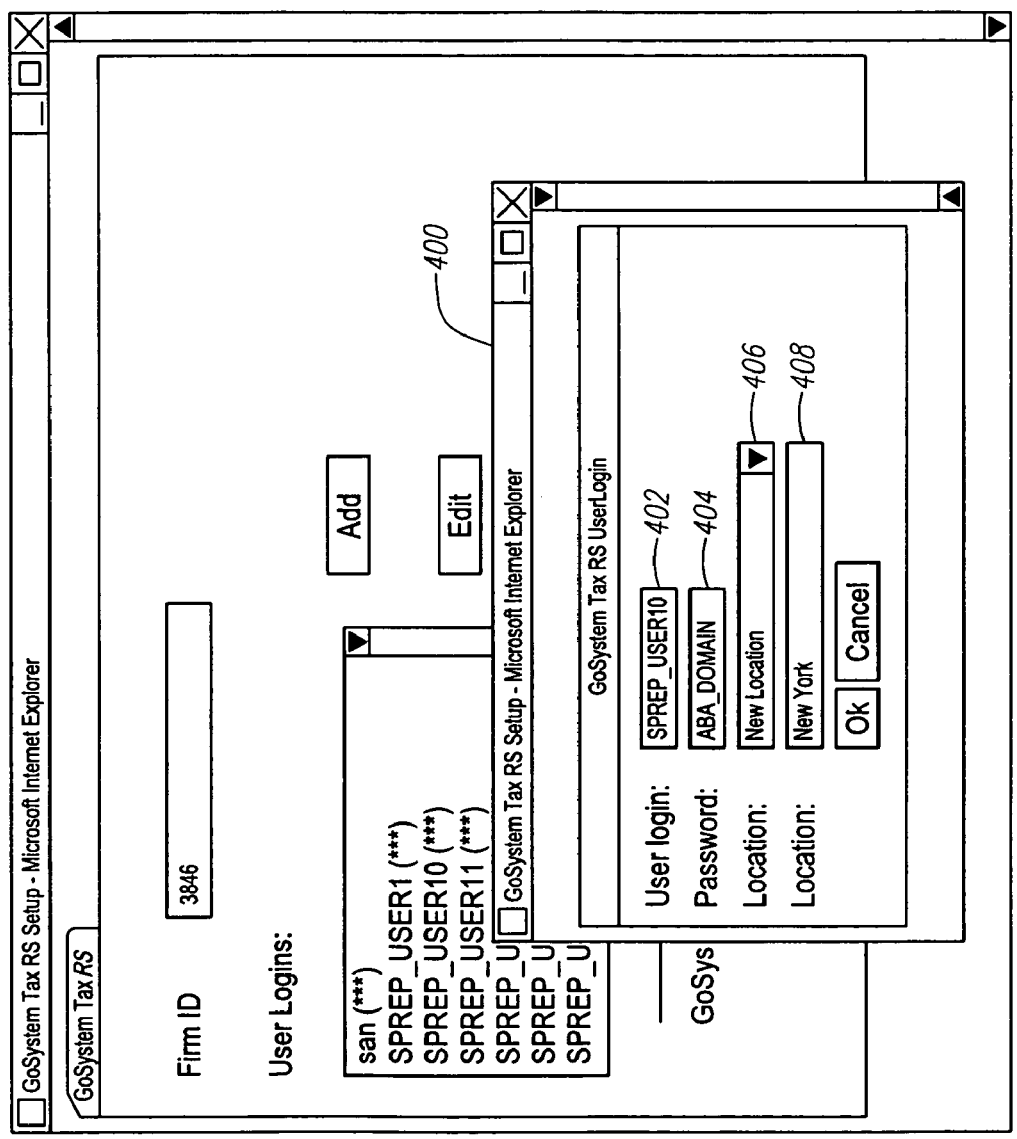
FIG. 4 is a view of an add login window that can be opened on the setup screen of FIG. 3 in accordance with an embodiment of the present invention.

After the add button 304 is selected, an add login window 400 is opened on the setup screen 300, as shown in FIG. 4, to create a new login. The add login window 400 prompts the system administrator to input a login, which includes inputting a user name 402, a password 404, and a location code 408 designating the location assigned to the user name 402 and the password 404. The system administrator can also select a location code 408 from a pull-down location menu 406. Therefore, multiple locations can have their own list of logins. Referring back to FIG. 3, a list box 310 displays a list of logins 312, which have been created for the entity and are available for use by the service provider. The term "service provider" may refer to an individual such as an accountant, a group of individuals, a company such as an accounting firm or an electronic device such as the service device 106. At any time, the system administrator can select a close button 314 to close the setup screen 300 or a cancel button 316 to end or exit the set up.

Referring back to FIG. 2A, after the list of logins has been created, a user of the client device 102 (FIG. 1) can provide or store (or cause to be stored) information, such as electronic documents and files, relating to an engagement on the server system 104 (FIG. 1 for use by the service provider for performance of the engagement (step 202 in FIG. 2A). The information is catalogued and organized using an engagement code. The term "user" may refer to a client, a customer, an individual, a group of individuals, a company or an electronic device such as a computer. In one embodiment, the information can include an image file and typed instructions to the service provider. The image file can be a portable document format (PDF) file, a tagged image file format (TIFF) file, a joint photographic experts group (JPEG) file or any other type of electronic file that can be stored on the server system 104 (FIG. 1) and copied and transmitted to the service device 106 (FIG. 1). The image file can include scanned tax documents, such as 1099s, W-2s, K-1s, dividend statements, income statements, profit and loss statements and settlement statements, for assisting the service provider in preparing the engagement. The user can also select a box 504 for completing this step later as shown in FIG. 5.

The user can submit an engagement for processing and completion by the service provider. For example, the user, using the client device 102 (FIG. 1), can submit an engagement by inputting the entity's identification code 302 (FIG. 3), the location code 408 (FIG. 4) and an engagement code 500 (FIG. 5) into an information window 502 (FIG. 5), as shown in FIG. 5 (step 204 in FIG. 2A). The information window 502 (FIG. 5) is generated by the server system 104 (FIG. 1) and is displayed by the client device 102 (FIG. 1).

Figure 5:
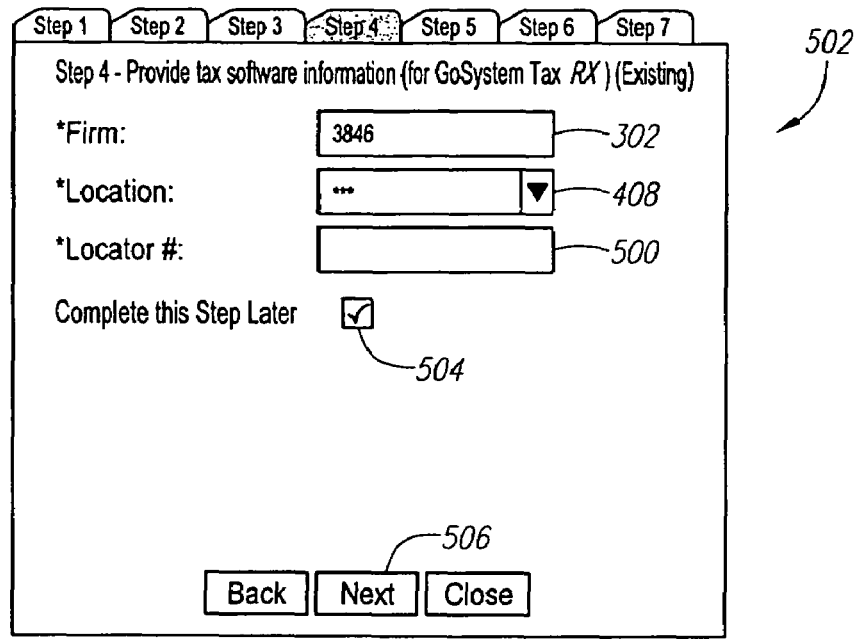
FIG. 5 is a view of an information window in accordance with an embodiment of the present invention.

The engagement code 500 (FIG. 5 can be a combination of letters and/or numbers uniquely identifying an engagement to be performed and completed. After the identification code 302 (FIG. 3), the location code 408 (FIG. 4) and the engagement code 500 (FIG. 5) have been input, the user can select a next button 506 (FIG. 5) to submit the engagement. After selecting the next button 506 (FIG. 5), the server system 104 (FIG. 1) receives a new submission indicator, which prompts the server system 104 to check or search the list of logins 312 (FIG. 3) for an available login (steps 206, 208 in FIG. 2A). If an available login exists, the available login is assigned to the engagement being submitted (step 210 in FIG. 2A) and the login, the identification code 302 (FIG. 3), the location code 408 (FIG. 4) and the engagement code 500 (FIG. 5) are sent to the server system 104 (step 212 in FIG. 2B). The server system 104 (FIG. 1) changes the status of the available login to unavailable (step 214 in FIG. 2B).

Figure 6:
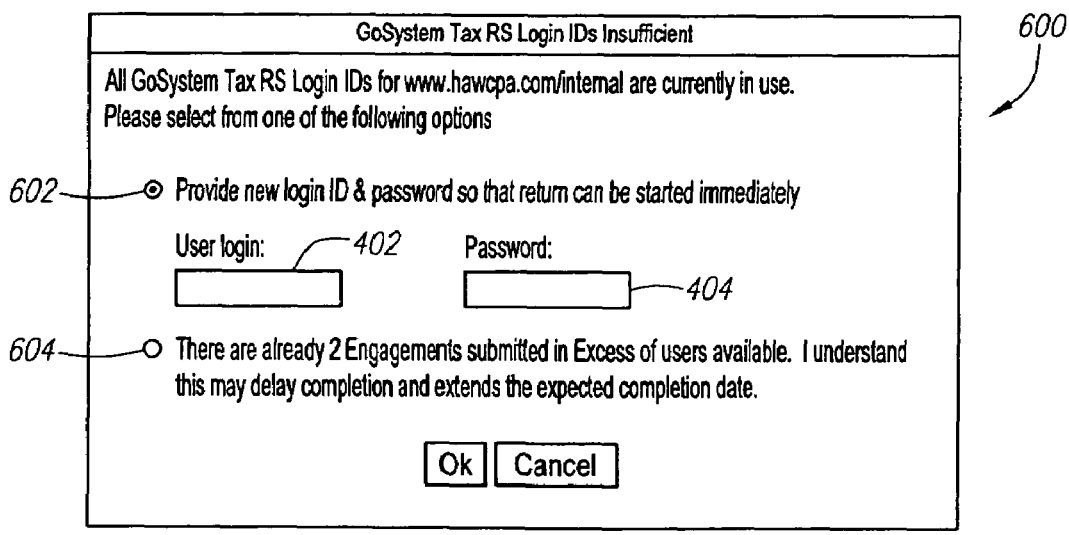
FIG. 6 is a view of an insufficient login window in accordance with an embodiment of the present invention.

If an available login does not exist, an insufficient login window 600 is displayed using the client device 102 as seen in FIG. 6 (step 216 in FIG. 2A).7 On the insufficient login window 600, a note is provided to the user stating that all logins are in use and thus are not available. The user can (1) create a new login by selecting a first button 602 or (2) wait until one of the logins becomes available by selecting a second button 604 (step 218 in FIG. 2A). If the user selects to create a new login (step 220 in FIG. 2A), then the user inputs a user name 402 and a password 404. Thereafter, the new login is assigned to the engagement (i.e., the engagement code 500) being submitted (step 210 in FIG. 2A) and the login, the identification code 302 (FIG. 3), the location code 408 (FIG. 4) and the engagement code 500 (FIG. 5) are sent to the server system 104 (FIG. 1) (step 212 in FIG. 2B). In one embodiment, the server system 104 as shown in FIG. 1 checks to determine if an engagement is in the queue and if so, the new login can be assigned to the first engagement in the queue. Also, the server system 104 changes the status of the new login to unavailable (step 214 in FIG. 2B). If the user selects to wait until one of the logins becomes available, the engagement is placed in the queue (step 219 in FIG. 2A) and the server system 104 periodically searches the logins for an available login (step 206 in FIG. 2A). The engagement remains in the queue until a login becomes available.

After the engagement is submitted to the server system 104, the information relating to the engagement (e.g., the login, the identification code 302 of FIG. 3, the location code 408 of FIG. 4, the engagement code 500 of FIG. 5, the image file and the typed instructions to the service provider) is copied and transferred to the service device 106 (FIG. 1) for processing by the service provider (step 221 in FIG. 2B). The service provider inputs the login and accesses the information relating to the engagement by searching for the engagement code 500 (step 222 in FIG. 2B) within the identification code 302 (FIG. 3) and the location code 408 (FIG. 4) provided. The service provider performs and completes the engagement (step 224 in FIG. 2B) and provides or sends a completed document or file of the completed engagement to the server system 104 (FIG. 1) (step 226 in FIG. 2B), which changes the status of the unavailable login to available (step 228 in FIG. 2B). The server system 104 (FIG. 1) checks if an engagement is in the queue (step 230 in FIG. 2B), and if so, the available login is assigned to the engagement (step 210 in FIG. 2A). Otherwise, the server system 104 (FIG. 1) waits for the submission of a new engagement.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Other embodiments are within the scope of the following claims. Accordingly, the present invention is not intended to be limited by the preferred embodiments, but is to be defined by reference to the appended claims.

What is claimed is:

1. A computer-implemented method for managing a submission of a plurality of engagements using a plurality of logins, comprising:

providing the plurality of logins corresponding to a single entity using a server, wherein each of the plurality of logins includes a user name, a password and a location code;

receiving, at the server, information relating to the plurality of engagements;

receiving, at the server, an entity identification code and a location code corresponding to the single entity and an engagement code corresponding to one of the plurality of engagements;

and searching the plurality of logins for an available login using the server, and when the available login does not exist, creating an available login, or returning to the searching step, and when the available login exists, assigning the available login to the one of the plurality of engagements, and making the available login an unavailable login, wherein an available login is a login which has already been created, and which is not currently being used, and an unavailable login is a login which has already been created, and which is currently being used.

2. The method of claim 1, wherein the information includes an image file.

3. The method of claim 2, wherein the image file includes a plurality of tax documents.

4. The method of claim 3, wherein the plurality of tax documents is selected from a group consisting of a 1099, W-2, K-1, dividend statement, income statement, profit and loss statement, and settlement statement.

5. The method of claim 1, further comprising adding the engagement code to a queue if an available login is not created.

6. The method of claim 1, further comprising determining if one of the plurality of engagements is in a queue.

7. The method of claim 1, further comprising placing one of the plurality of engagements in a queue.

8. The method of claim 1, further comprising transferring the available login, the entity identification code and the engagement code to a service provider.

9. The method of claim 1, further comprising: receiving a document representing a completed engagement; and making the unavailable login an available login.

10. A computer program embodied on a computer readable medium for managing a submission of a plurality of engagements using a plurality of logins, comprising instructions operable to cause a computer to:

store the plurality of logins corresponding to a single entity, wherein each of the plurality of logins includes a user name, a password and a location code;

receive a client identification code corresponding to the single entity and an engagement code corresponding to an engagement;

search the plurality of logins for an available login, and when the available login does not exist, creating an available login, or returning to the search step, and when the available login exists, assign the available login to the engagement code;

and make the available login, an unavailable login, wherein an available login is a login which has already been created, and which is not currently being used, and an unavailable login is a login which has already been created, and which is currently being used.

11. The computer program of claim 10, further comprising instructions to receive information relating to the engagement.

12. The computer program of claim 11, wherein the information includes an image file.

13. The computer program of claim 12, wherein the image file includes one or more of the following documents: a 1099, W-2, K-1, dividend statement, income statement, profit and loss statement, and settlement statement.

14. The computer program of claim 10, further comprising instructions to receive a completed tax document corresponding to the engagement.

15. The computer program of claim 14, further comprising instructions to make the unavailable login, an available login, after receiving the completed tax document.

16. A computer-implemented method for managing a submission of a plurality of engagements using a plurality of logins, comprising:

provicing the plurality of logins corresponding to a single entity using a server, wherein each of the plurality of logins includes a user name, a password and a location code;

receiving, at the server, information relating to the plurality of engagements, wherein the information are images of a plurality of tax documents;

receiving, at the server, an entity identification code and a location code corresponding to the single entity and an engagement code corresponding to one of the plurality of engagements;

searching the plurality of logins for an available login using the server, wherein the available login is a login which has already been created, and which is not currently being used;

receiving, at the server, data relating to one of creating an available login or returning to the searching step or determining if the one of the plurality of engagements is in a queue, when the available login does not exist;

adding, at the server, the one of the plurality of engagements to the queue when the one of the plurality of engagements is determined to not be in the queue and when the available login does not exist;

assigning, at the server, the available login to the one of the plurality of engagements, and making the available login an unavailable login when the available login exists, wherein the unavailable login is a login which has already been created, and which is currently being used;

receiving, at the server, a document representing a completed engagement;

and making the unavailable login an available login using the server.

\* \* \* \* \*